US009002931B2

(12) United States Patent
Maison et al.

(10) Patent No.: US 9,002,931 B2
(45) Date of Patent: Apr. 7, 2015

(54) HIGH-SPEED LOW-LATENCY METHOD FOR STREAMING REAL-TIME INTERACTIVE IMAGES

(75) Inventors: Benjamin Maison, Montreal (CA); Dean Lester, Woodinville, WA (US)

(73) Assignee: Real-Scan, Inc., Woodinville, WA (US)

( * ) Notice: Subject to any disclaimer, the term of this patent is extended or adjusted under 35 U.S.C. 154(b) by 176 days.

(21) Appl. No.: 13/476,806

(22) Filed: May 21, 2012

(65) Prior Publication Data

US 2013/0080508 A1  Mar. 28, 2013

Related U.S. Application Data

(60) Provisional application No. 61/583,533, filed on Jan. 5, 2012.

(51) Int. Cl.
   G06F 15/16 (2006.01)
   H04L 29/06 (2006.01)
   H04L 1/18 (2006.01)
   H04L 12/861 (2013.01)
   H04N 21/234 (2011.01)
   H04N 21/44 (2011.01)
   H04L 12/70 (2013.01)

(52) U.S. Cl.
   CPC ............ H04L 65/608 (2013.01); H04L 1/1835 (2013.01); H04L 1/1874 (2013.01); H04L 49/9089 (2013.01); H04N 21/23406 (2013.01); H04N 21/44004 (2013.01); H04L 2012/5681 (2013.01)

(58) Field of Classification Search
   CPC . H04L 1/1835; H04L 1/1874; H04L 49/9089; H04L 65/608; H04L 2012/5681; H04N 21/23406; H04N 21/44004
   USPC .......................... 709/203, 223, 224, 231, 232
   See application file for complete search history.

(56) References Cited

U.S. PATENT DOCUMENTS

| | | | |
|---|---|---|---|
| 2002/0019916 A1* | 2/2002 | Henrion | 711/159 |
| 2002/0116595 A1* | 8/2002 | Morton | 712/22 |
| 2004/0003104 A1* | 1/2004 | Boskovic et al. | 709/231 |
| 2004/0006611 A1* | 1/2004 | Yi | 709/222 |
| 2004/0105030 A1* | 6/2004 | Yamane | 348/460 |
| 2004/0215708 A1* | 10/2004 | Higashi et al. | 709/201 |
| 2007/0110087 A1* | 5/2007 | Abel et al. | 370/412 |
| 2007/0201475 A1* | 8/2007 | Li et al. | 370/392 |
| 2010/0067534 A1* | 3/2010 | Shimizu et al. | 370/401 |
| 2013/0120367 A1* | 5/2013 | Miller et al. | 345/419 |

* cited by examiner

*Primary Examiner* — Liangche A Wang
*Assistant Examiner* — Johnny Aguiar
(74) *Attorney, Agent, or Firm* — Lee & Hayes, PLLC; Benjamin A. Keim

(57) ABSTRACT

An optimized ACK-less ("no acknowledgement required") communication between the client and the server is enabled. Regardless of distance between the client and server, complete synchronization between the mouse movement, or any other updates to the three-dimensional model, and the rendered result is attained. Maximum frame rate is also attained, without requiring the inefficiency, and resulting latency, of acknowledged packets.

15 Claims, 9 Drawing Sheets

)# HIGH-SPEED LOW-LATENCY METHOD FOR STREAMING REAL-TIME INTERACTIVE IMAGES

CROSS-REFERENCE TO RELATED APPLICATION

This application claims the benefit of U.S. Provisional Application No. 61/583,533, filed Jan. 5, 2012, which is expressly incorporated herein by reference in its entirety.

BACKGROUND

In a typical client-server environment, the client and server communicate with each other over a network. For example, the client may be interacting with a three-dimensional model rendered by the server. The client would prefer to see their interactions with the model updated in real-time, to increase the usability of the application.

For example, consider the case of a camera manipulation, where the user uses the mouse to rotate the model. During the mouse movement, hundreds of events are generated, each of them represents a new desired camera position. Each new desired camera position is sent to the server using a packet asking for the server to generate a new image. The new image corresponds to the data the packet contains. For example, the packet could contain data including camera position in the X, Y, and Z directions.

Depending on the computer clock speed, the number of events that are generated can be more than 100 events for each second of mouse movement.

If it takes approximately 17 milliseconds for the server to render one frame, and if the client sends all 100 events generated by one second of mouse manipulation, it would take 17×100 milliseconds=1.7 seconds to generate all the frames for the 1 second of mouse movement. So 1 second on the client side will result in 1.7 seconds of images rendering on the server side, which leads to de-synchronization between the client and the server.

The usual solution to this problem is to stop sending packets until the server acknowledges (ACK) to the client that the image has been rendered and that the server is now ready for the next packet. But this solution creates a correlation between the geographical distance (between the client and the server) and the frame rate—the further the distance between the client and the server, the longer the packets take to arrive, resulting in a lowered frame rate and sluggish responsiveness.

Therefore, responsiveness of a streaming application could be improved by a solution that minimized the effect of geographical distance between a client and a server.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes, in part, techniques for rendering an ordered series of two-dimensional images to create a three-dimensional solid model, including processing multiple input events in a "stack." Techniques described herein allow for efficient generation of three-dimensional models and provide an efficient user interface for manipulating those models.

In one implementation, a stack is located on a server. Every time a new packet arrives from the client, it is queued in this stack. Using a "first in, first out" ordering, the server handles the packets one by one by processing the packet on the bottom of the stack.

The packet being processed is locked by the server. Once the processing is complete, the packet is unlocked and destroyed, then the next packet in the stack is handled, and so on. Multiple packets may be locked simultaneously without changing the overall operation of the system. Discussions of locking a packet herein are to be understood as applying equally to implementations that lock a plurality of packets.

In a camera movement example using this system, a hundred packets or more may queue in the stack and will be handled one by one. If it takes approximately 17 milliseconds for the server to render one frame, and if the client sends all 100 events generated by one second of mouse manipulation, it would take 17×100 milliseconds=1.7 seconds to generate all the frames for the 1 second of mouse movement.

To solve this latency issue, when a new packet arrives at the server, a process searches inside the stack for a packet that has the same category identifier as the new one. If there is a match and if the discovered packet is not locked (i.e. currently being processed), then instead of queuing the new packet, the process replaces the discovered packet in the stack with the new packet. By doing so, the system always has at most one update packet per category in the stack. This update packet is always the most recent version for any given category since the system automatically replaces any out-of-date information.

As a result, regardless of distance between the client and server, complete synchronization between the mouse movement, or any other updates to the three-dimensional model, and the rendered result is attained. Maximum frame rate is also attained, without requiring the inefficiency, and resulting latency, of waiting for acknowledged packets.

In an alternative implementation, a similar stack is running on the client side for input events, optimizing the network usage by not sending old data when there is newer data available.

With these techniques, an optimized ACK-less ("no acknowledgement required") communication between the client and the server is enabled, which results in a fast frame rate.

Illustrative Architecture

Figure 1:
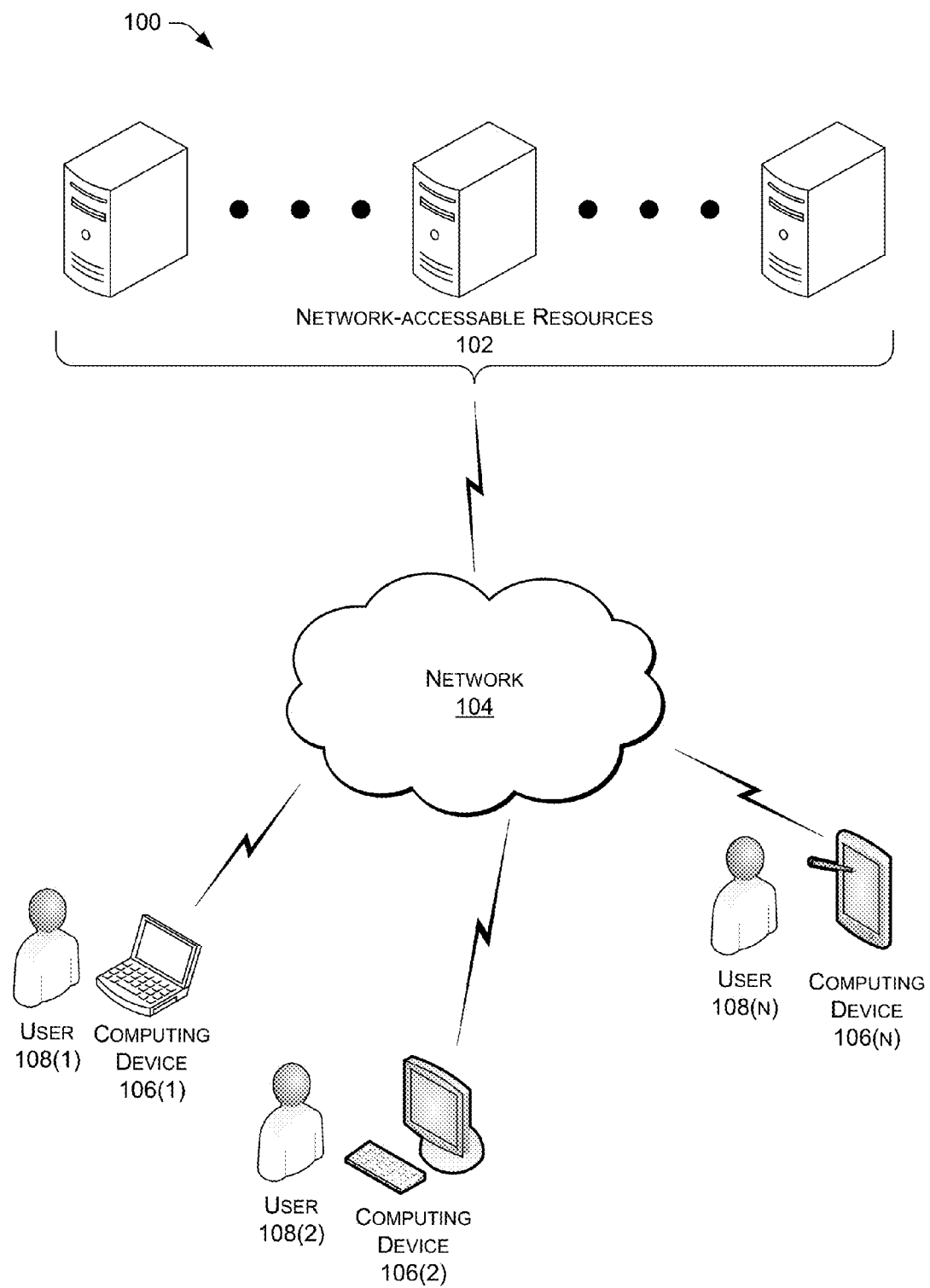
FIG. 1 shows an illustrative architecture for rendering and distributing interactive images in a distributed environment.

FIG. 1 shows an illustrative architecture 100 for implementing techniques to provided physically remote and network-accessible (i.e., "cloud-based") rendering of three-dimensional models. Network-accessible resources 102 (e.g., network server computers) are connected through a network 104 to one to n computing devices 106(1)-106(n) accessed by users 108(1)-108(n) respectively. The users 108(1)-108(n) may view three-dimensional models on one of the computing devices 106(1)-106(n), with the three-dimensional models being rendered into images by the cloud-based resources 102. The computing devices 106(1)-106(n) may include any type of computing device such as a desktop computer, a laptop computer, a tablet computer, a mobile phone, a personal digital assistant, a set top box, a game console, a thin client, or any other apparatus. Although described in this disclosure primarily as a distributed system, the components and techniques described herein may also be implemented in a single computing device potentially without network connections or as a local system in which case the network-accessible resources 102 would not necessary be physically remote from other components of this system.

Figure 2:
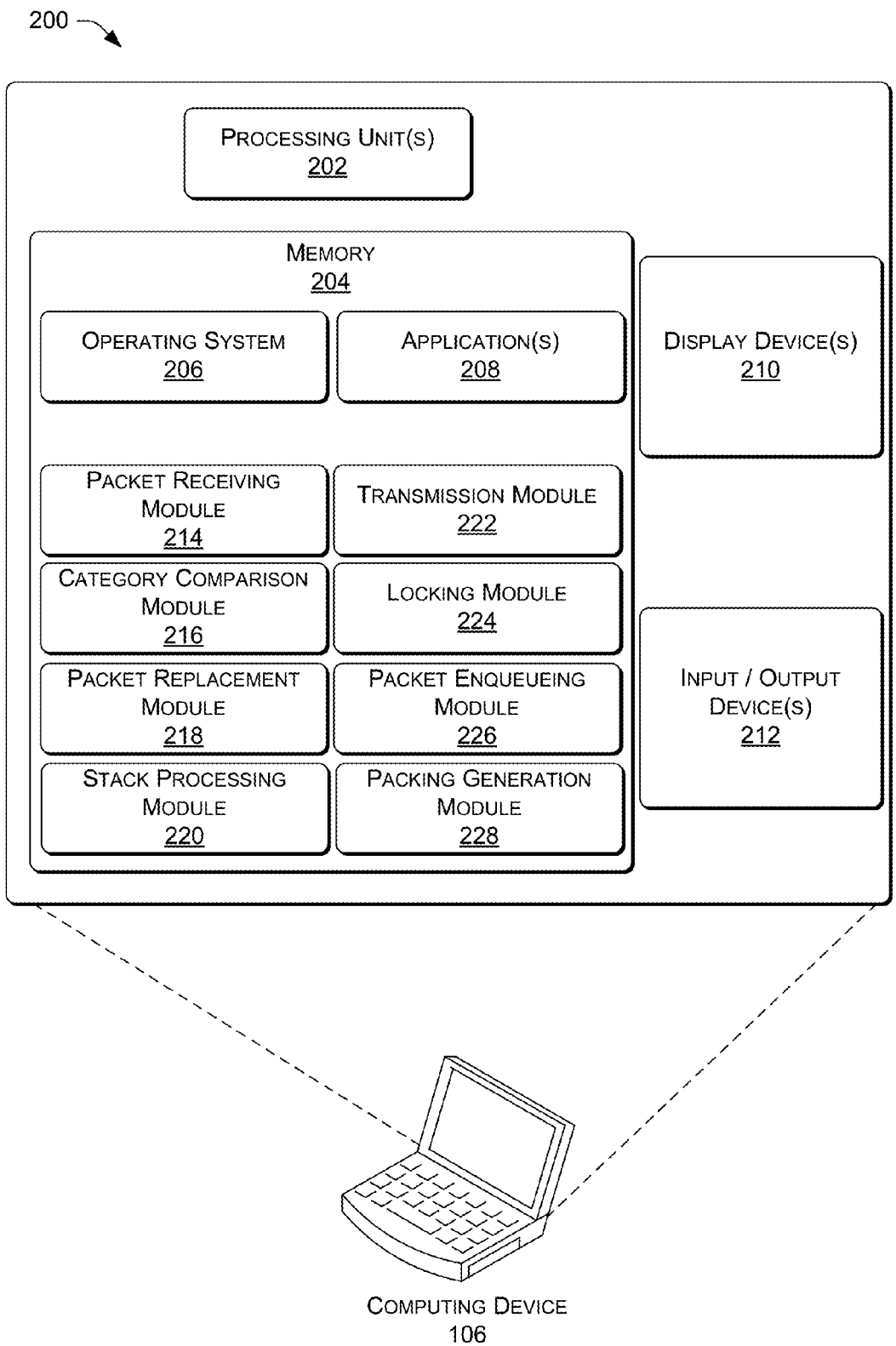
FIG. 2 shows a computing device and its components.

FIG. 2 shows an illustrative block diagram 200 of one of the computing devices 106 of FIG. 1. The computing device 106 may include one or more processing units 202 and a memory 204. The memory 204 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 204 may contain an operating system 206 for controlling software and hardware resources available to the computing device 106 and one or more applications 208, including a web browser. The computing device 106 may also be equipped with one or more display devices 210 for showing three-dimensional models. In some implementations, the applications 208 may provide an interface for the user 108 to view and interact with the three-dimensional models, other two-dimensional, and/or three-dimensional images. The applications may include a web browser, which comprises an application capable of handling markup language documents, and accessing, receiving, sending, and viewing information over the network 104, and similar operations. The computing device 106 may also include other input and output devices 212 such as a keyboard, mouse, speakers, and the like.

The memory 204 may store program instructions. The program instructions, or modules, may include routines, programs, objects, components, and data structures that perform particular tasks or implement particular abstract data types. The selected program instructions may include a packet receiving module 214 that receives packets via the network 104, a category comparison module 216 that determines whether packets have the same category identifier, a packet replacement module 218 that replaces, overwrites, or substitutes one packet with another packet, a stack processing module 220 that processes the packet at the bottom of the stack, a transmission module 222 that sends the results of processing a packet over the network 104, a locking module 224 that locks a packet or packets for processing, a packet enqueueing module 226 that adds a packet to the top of a stack, and a packet generation module 228 that creates a packet in response to a user input or a command from a user.

System Configuration

Figure 3:
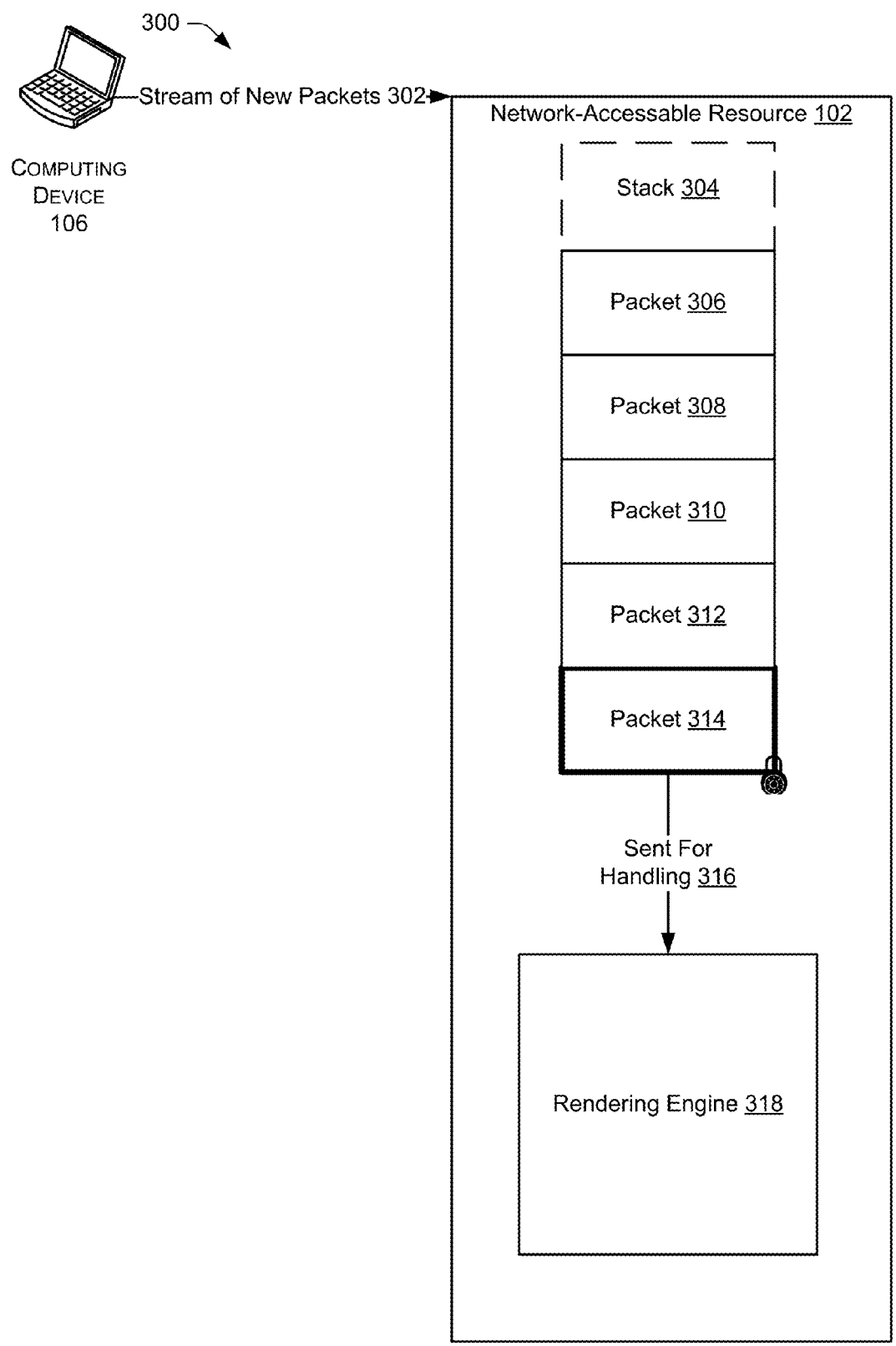
FIG. 3 shows a network-accessible resource of FIG. 1 handling a stream of input events from a computing device.

FIG. 3 shows a configuration 300 of the system. Computing device 106 sends a stream of new packets 302 to the network-accessible resource 102. The network-accessible resource 102 comprises a stack 304. The stack comprises packets 306-314. In this example, packet 314 is locked for processing, and is sent for handling 316 to the rendering engine 318.

Figure 4:
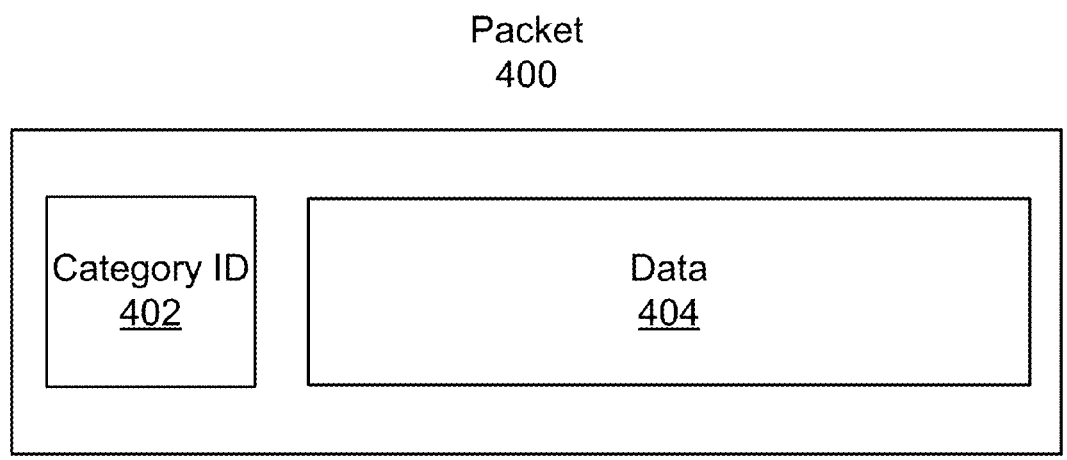
FIG. 4 shows a packet of FIG. 3 in greater detail.

FIG. 4 shows one illustrative configuration of a packet 400. A packet 400 may be generated in response to user input or a command from a user. The packet 400 comprises a category identifier 402 and data 404. The category identifier 402 may indicate that a category associated with the accompanying data 404 is any of the following types: a still image, a movie, a camera position, a camera focal point, a camera vector, a camera zoom level, a camera zoom mode, a camera field of view, a camera clipping plane, a camera traveling time, a camera trigger, a camera quality, a camera resolution, a Gaussian filter, a three-dimensional lookup table, a histogram, a slice of a model along an axis, a refresh view command, a change window or level command including a window or level setting, an add label command including a set of coordinates, a diffuse lighting setting, an ambient lighting setting, a specular lighting setting, a bookmark for a scene at a camera position and a three-dimensional lookup table at a moment in time, a cut model command including a shape used to cut the model, a mesh export, a render movie command including a camera path, or any other command relating to handling manipulation of a three-dimensional model.

Illustrative Examples

FIGS. 5A-5F show illustrative representations of the operation of a stack 500 as it receives new packets 502-508.

Figure 5A:
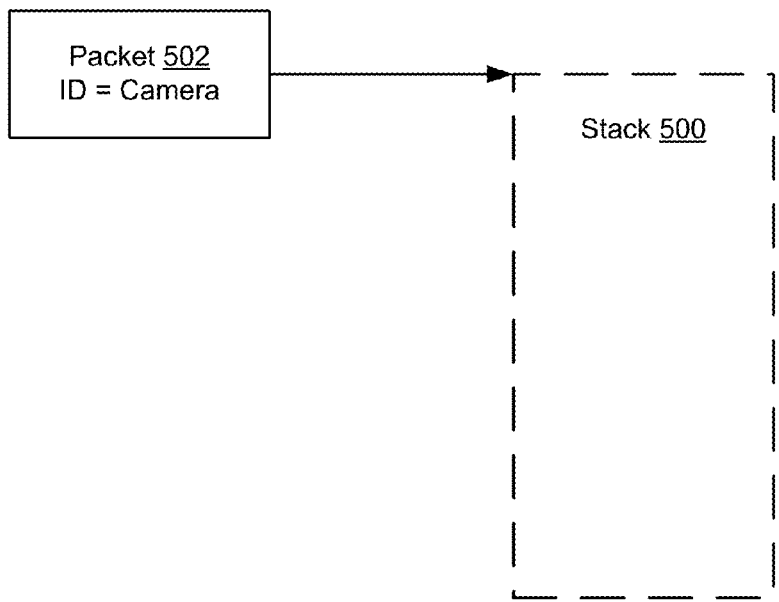
FIGS. 5A-5F show an illustrative description of the operation of the stack as it receives new packets from a computing device.

In FIG. 5A, a packet 502 arrives at the stack 500 with a category identifier of camera position. The stack 500 is empty. As the stack 500 is empty, packet 502 is directly added, locked, and processed by the rendering engine 318.

Figure 5B:
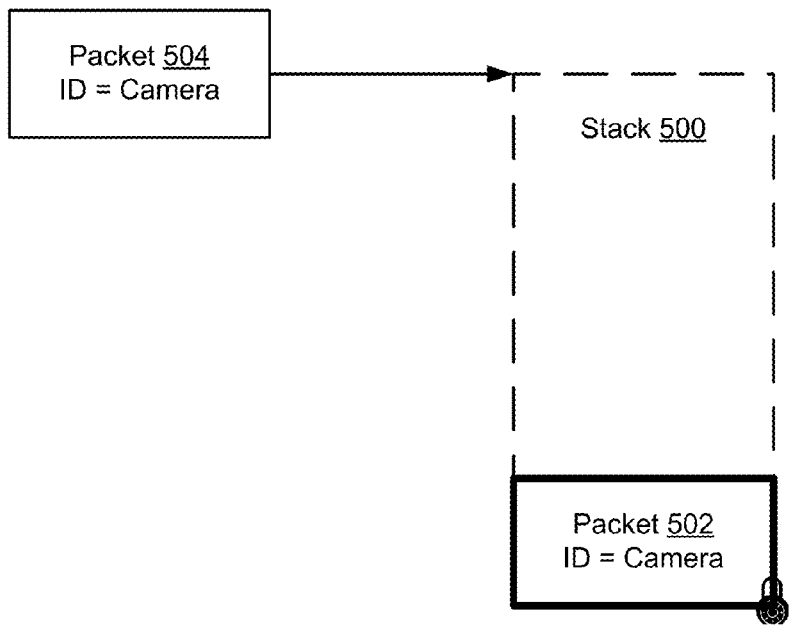

In FIG. 5B, a second packet 504 arrives at the stack 500 with a category identifier of camera position. The stack 500 is searched for a packet that has the same category identifier (camera position) as packet 504. Packet 502 has the same category identifier, but because packet 502 is locked, packet 502 is not replaced. Thus, packet 504 is queued in the stack at the top of the stack.

Figure 5C:
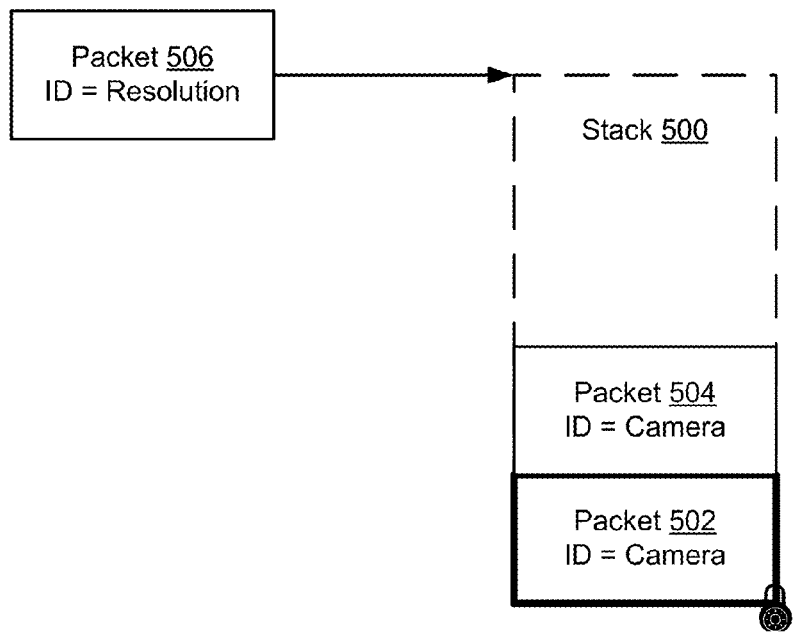

In FIG. 5C, a third packet 506 arrives at the stack 500 with a category identifier of resolution. The stack 500 is searched for a packet that has the same category identifier (resolution) as packet 506. Even though there are other packets (502, 504) in the stack, none of them have the same category identifier. Thus, packet 506 is queued in the stack.

Figure 5D:
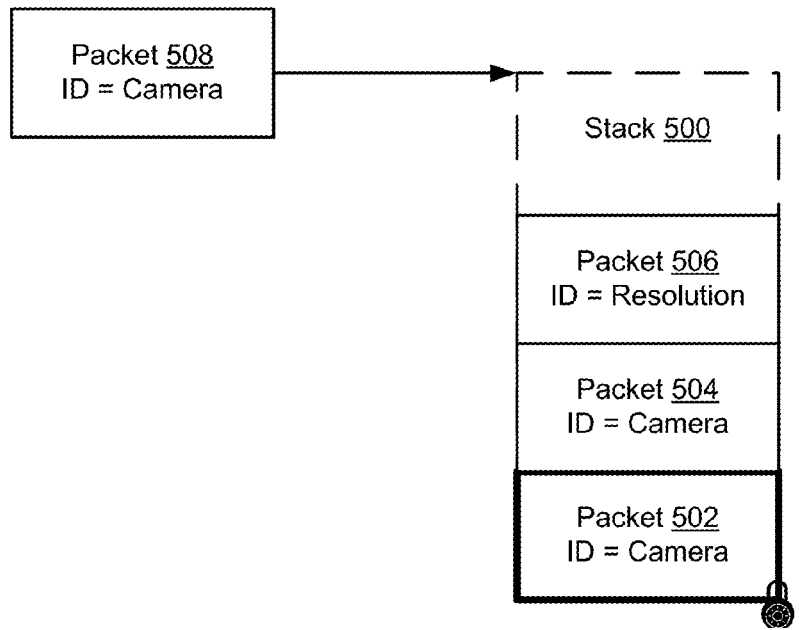

In FIG. 5D, a fourth packet 508 arrives at the stack 500 with a category identifier of camera position. This time, when the stack 500 is searched for a packet that has the same category identifier (camera position) as packet 508, packet 502 and packet 504 are found. Packet 502 is locked for processing, so it is not replaced. Since packet 504 has a category identifier (camera position) that matches the category identifier for packet 508, packet 504 is replaced by packet 508.

Figure 5E:
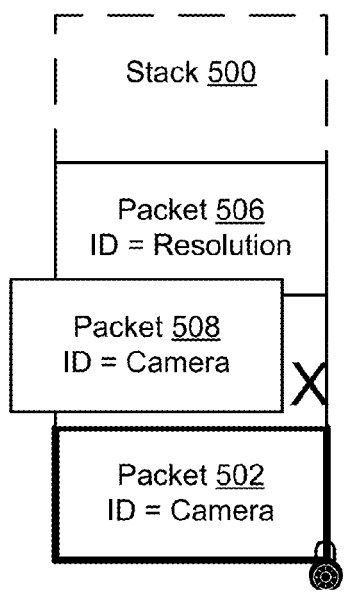
Figure 5F:
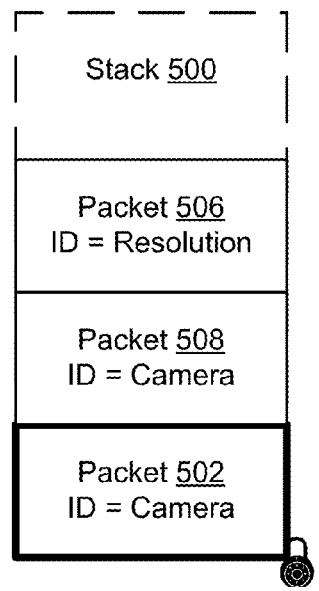

In FIGS. 5E and 5F, packet 504 is replaced by packet 508 in the stack 500. Packet 504 is discarded, and packet 508 takes the place of packet 504 in the stack 500. Packet 508 replaces packet 504, but is not added to the top of the stack 500 or otherwise queued in the stack 500 at any additional positions.

Figure 6:
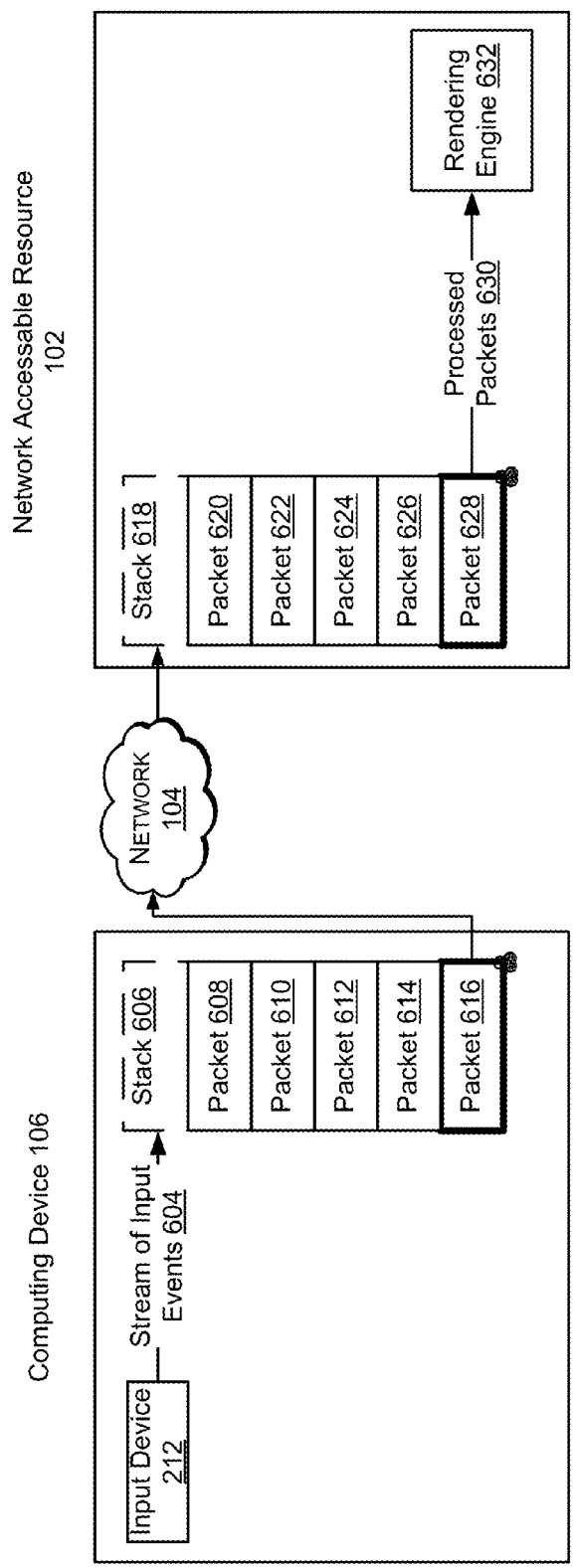
FIG. 6 shows an alternate implementation including a stack on both the computing device and the network-accessible resource.

FIG. 6 shows an alternative implementation. Here, both the computing device 106 and the network-accessible resource 102 have respective stacks, 606 and 618. These stacks, 606 and 618, operate in a similar manner to those discussed in relation to FIGS. 3 and 5A-5F. If the stream of input events 604 from the input device 212 has a packet with a category identifier that is the same as the category identifier of one of packets 608-614, the packet with the same category identifier is replaced with the packet from the stream of input events 604. If the packets received from the network 104 at the network-accessible resource 102 include a packet with a category identifier that is the same as the category identifier of one of packets 620-626, the packet with the same category identifier is replaced with the packet from the network 104. Packets 616 and 628 are locked for processing, and are therefore not replaced, even if a packet with the same category identifier is received from the stream of input events 604 or over the network 104. After a packet is processed 630, it is sent to the rendering engine 632, which uses the data included in the packet for rendering operations. The stack 606 on the computing device 106 functions to prevent old data from being sent from the computing device 106 over the network 104 to the network-accessible resource 102.

Illustrative Process

Process 700 is illustrated as a collection of blocks in logical flow graphs, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. All or part of the process may be executed using multiple CPUs and GPUs, and may be executed simultaneously, in parallel, both, or neither.

Figure 7:
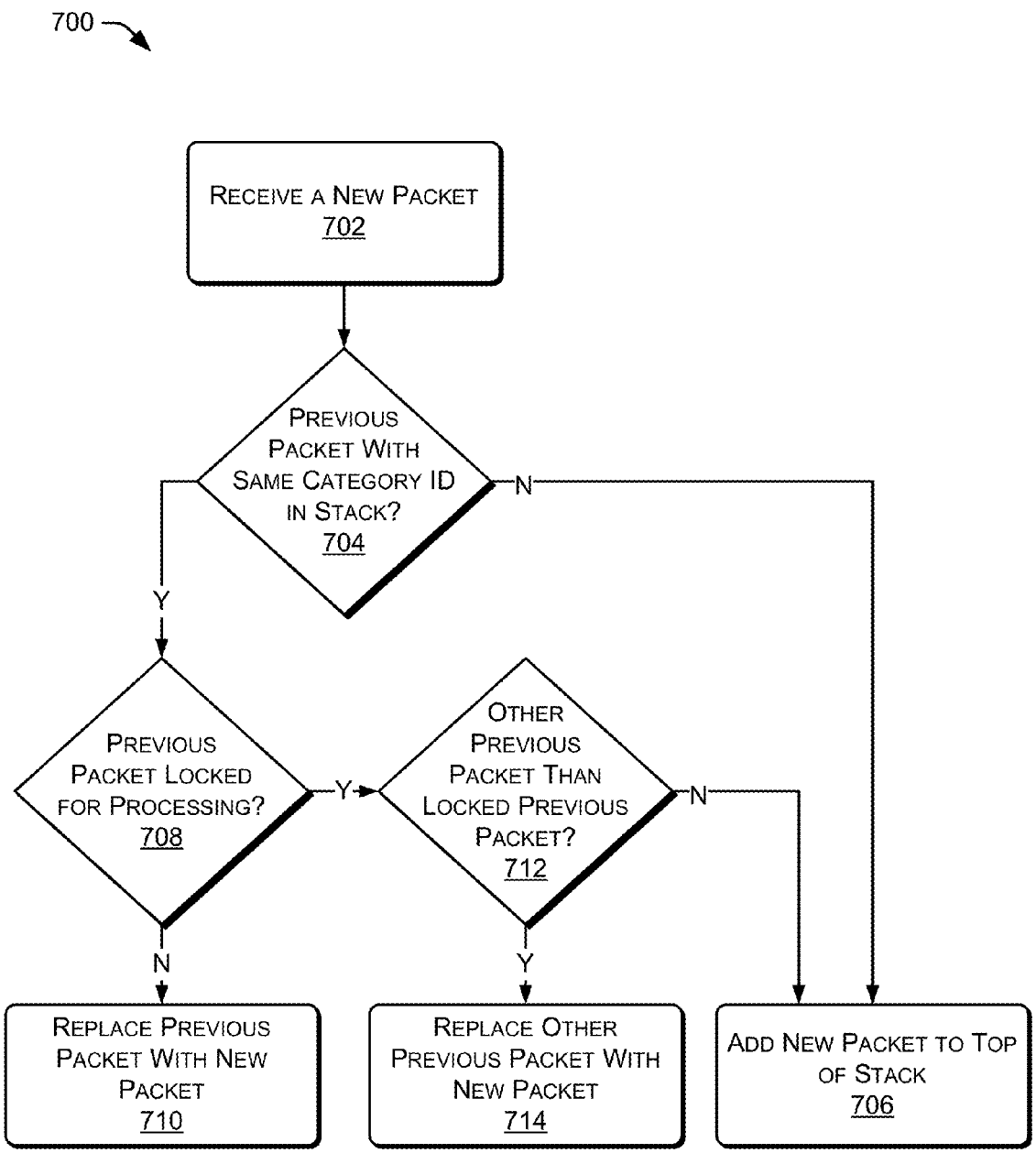
FIG. 7 shows an illustrative procedure for adding new packets to the stack.

FIG. 7 shows an illustrative procedure 700 for adding new packets to a stack.

At 702, a stack receives a new packet including a category identifier and data.

At 704, the stack is examined for any other packets, which were previously added to the stack, with the same category identifier as the new packet.

At 706, if there are no previously added packets with the same category identifier as the new packet, the new packet is enqueued to the top of the stack.

At 708, if there is a previously added packet with the same category identifier as the new packet, the previously added packet is checked to determine if it is locked.

At 710, if it is determined at 708 that the previously added packet is not locked, the previously added packet is replaced with, overwritten by, or substituted for the new packet.

At 712, if it is determined at 708 that the previously added packet is locked, the previously added packet is retained, not overwritten, or ignored, and the stack is checked for another previously added packet that is not locked.

At 714, if it is determined at 712 that there is another previously added packet, the other previously added packet is replaced with the new packet.

At 706, if it is determined at 712 that there is no other previously added packet, the new packet is enqueued to the top of the stack.

CONCLUSION

Although the subject matter of this disclosure has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method implemented by one or more processors for providing acknowledgment-less server-client communication comprising:
   receiving a packet comprising a category identifier and data;
   determining that no previously added packet in a stack has a same category identifier then adding the packet to a top of the stack;
   determining that a previously added packet in the stack has the same category identifier as the packet;
   determining that the previously added packet in the stack with the same category identifier is locked for processing then adding the packet to the top of the stack;
   determining that the previously added packet in the stack with the same category identifier is not locked for processing then overwriting at a same position in the stack the previously added packet with the same category identifier with the packet; and
   processing the packet when the packet reaches a bottom of the stack.

2. A method as recited in claim 1, wherein the data comprises at least one of still image data or movie data.

3. A method as recited in claim 1, further comprising generating the packet in response to a user input or a command from a user.

4. A method as recited in claim 1, wherein the category identifier refers to a type of the data in the packet, wherein the type of the data is at least one of a still image, a movie, a camera position, a camera focal point, a camera vector, a camera zoom level, a camera zoom mode, a camera field of view, a camera clipping plane, a camera traveling time, a camera trigger, a camera quality, a camera resolution, a Gaussian filter, a three-dimensional lookup table, a histogram, a slice of a model along an axis, a refresh view command, a change window or level command including a window or level setting, an add label command including a set of coordinates, a diffuse lighting setting, an ambient lighting setting, a specular lighting setting, a bookmark for a scene at a camera position and a three-dimensional lookup table at a moment in time, a cut model command including a shape used to cut the model, a mesh export, or a render movie command including a camera path.

5. A computing system comprising:
   one or more processing units;
   one or more network interfaces coupled to the one or more processing units and configured to receive, send, or send and receive data over one or more networks;
   a packet receiving module integrated with or coupled to the one or more processing units and configured to receive a packet comprising a category identifier and the data from a computing device via the one or more network interfaces;
   a category comparison module configured to determine if a previously added packet in a stack has a same category identifier as the packet;
   a packet replacement module that overwrites the previously added packet at a position of the previously added packet with the packet if the category comparison module determines that the previously added packet in the stack has the same category identifier as the packet;
   a locking module that locks the previously added packet while the one or more processing units process the previously added packet, wherein the category comparison module and the packet replacement module are configured to ignore the previously added packet if the previously added packet is locked for processing;
a packet enqueuing module that adds the packet to a top of the stack if the previously added packet is locked for processing and adds the packet to the top of the stack if no previously added packets in the stack have the same category identifier as the packet; and
a stack processing module that processes the packet when the packet reaches a bottom of the stack.

6. A system as recited in claim 5, further comprising a transmission module that sends a result of processing the packet to the computing device using one of the one or more network interfaces.

7. A system as recited in claim 5, wherein the data comprises at least one of still image data or movie data.

8. A system as recited in claim 5, wherein the category identifier refers to a type of the data in the packet, wherein the type of the data is at least one of a still image, a movie, a camera position, a camera focal point, a camera vector, a camera zoom level, a camera zoom mode, a camera field of view, a camera clipping plane, a camera traveling time, a camera trigger, a camera quality, a camera resolution, a Gaussian filter, a three-dimensional lookup table, a histogram, a slice of a model along an axis, a refresh view command, a change window or level command including a window or level setting, an add label command including a set of coordinates, a diffuse lighting setting, an ambient lighting setting, a specular lighting setting, a bookmark for a scene at a camera position and a three-dimensional lookup table at a moment in time, a cut model command including a shape used to cut the model, a mesh export, or a render movie command including a camera path.

9. A system as recited in claim 5, further comprising a packet generation module that creates the packet in response to a user input or a command from a user.

10. One or more non-transitory computer-readable media storing computer-executable instructions that, when executed on one or more processing units, cause the one or more processing units to perform acts for providing dynamic swapping of queued input packets, the acts comprising:
receiving a packet comprising a category identifier and data;
determining if a previously added packet in a stack has a same category identifier as the packet;
determining if the previously added packed is locked for processing;
overwriting the previously added packet by writing the packet at a same position in the stack as the previously added packet if the determining indicates that the previously added packet in the stack has the same category identifier as the packet and the previously added packet is not locked;
adding the packet to a top of the stack in response to (i) determining that the previously added packet in the stack does not have the same category identifier or (ii) determining that the previously added packet in the stack is locked for processing; and
processing the packet when the packet reaches a bottom of the stack.

11. One or more non-transitory computer-readable media as recited in claim 10, wherein the data comprises at least one of still image data or movie data.

12. One or more non-transitory computer-readable media as recited in claim 10, wherein the acts further comprise generating the packet in response to a user input or a command from a user.

13. One or more non-transitory computer-readable media as recited in claim 10, wherein the category identifier refers to a type of the data in the packet, wherein the type of the data is at least one of a still image, a movie, a camera position, a camera focal point, a camera vector, a camera zoom level, a camera zoom mode, a camera field of view, a camera clipping plane, a camera traveling time, a camera trigger, a camera quality, a camera resolution, a Gaussian filter, a three-dimensional lookup table, a histogram, a slice of a model along an axis, a refresh view command, a change window or level command including a window or level setting, an add label command including a set of coordinates, a diffuse lighting setting, an ambient lighting setting, a specular lighting setting, a bookmark for a scene at a camera position and a three-dimensional lookup table at a moment in time, a cut model command including a shape used to cut the model, a mesh export, or a render movie command including a camera path.

14. One or more non-transitory computer-readable media as recited in claim 10, wherein the processing is carried out in an order of first-in-first-out.

15. One or more non-transitory computer-readable media as recited in claim 10, wherein the acts further comprise:
determining the previously added packet is locked for processing;
determining a different previously added packet in the stack has the same category identifier as the packet; and
substituting the packet for the different previously added packet.

* * * * *